United States Patent
Wang et al.

(10) Patent No.: US 10,122,564 B2
(45) Date of Patent: Nov. 6, 2018

(54) WIRELESS COMMUNICATION DEVICE AND METHOD THEREIN FOR TIME SYNCHRONIZATION IN A WIRELESS COMMUNICATION NETWORK

(71) Applicant: TELEFONAKTIEBOLAGET LM ERICSSON (PUBL), Stockholm (SE)

(72) Inventors: Hai Wang, Beijing (CN); Shaohua Li, Beijing (CN); Jianfeng Wang, Beijing (CN); Yanli Zheng, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/543,884

(22) PCT Filed: Dec. 7, 2015

(86) PCT No.: PCT/CN2015/096546
§ 371 (c)(1),
(2) Date: Jul. 14, 2017

(87) PCT Pub. No.: WO2017/096506
PCT Pub. Date: Jun. 15, 2017

(65) Prior Publication Data
US 2017/0373898 A1 Dec. 28, 2017

(51) Int. Cl.
*H04L 7/00* (2006.01)
*H04L 27/26* (2006.01)
*H04L 25/02* (2006.01)

(52) U.S. Cl.
CPC .......... *H04L 27/266* (2013.01); *H04L 25/022* (2013.01); *H04L 25/0204* (2013.01); *H04L 25/0212* (2013.01); *H04L 27/2659* (2013.01)

(58) Field of Classification Search
CPC . H04L 27/266; H04L 27/2659; H04L 25/022; H04L 25/0212; H04L 25/0204
See application file for complete search history.

(56) References Cited

U.S. PATENT DOCUMENTS 6,219,333 B1 * 4/2001 Ahn ..................... H04L 27/2659
370/203
6,373,861 B1 * 4/2002 Lee ......................... H04L 5/026
370/342

(Continued)

FOREIGN PATENT DOCUMENTS

CN 1773979 A 5/2006
CN 101079688 A 11/2007

(Continued)

OTHER PUBLICATIONS

International Search Report and Written Opinion issued in Application No. PCT/CN2015/096546 dated Sep. 14, 2016, 6 pages.

(Continued)

*Primary Examiner* — Jay P Patel
(74) *Attorney, Agent, or Firm* — Rothwell, Figg, Ernst & Manbeck, p.c.

(57) ABSTRACT

A wireless communication device and method therein for time synchronization in a wireless communication network are disclosed. The wireless communication device determines a first timing (tc) by performing a coarse time synchronization based on a synchronization signal received by the wireless communication device, wherein the received synchronization signal is sampled either in an original sampling rate or a reduced sampling rate. The wireless communication device determines a second timing (tf) by performing a fine time synchronization based on the determined first timing (tc) and the received synchronization signal.

16 Claims, 8 Drawing Sheets

(56) References Cited

U.S. PATENT DOCUMENTS

| | | | |
|---|---|---|---|
| 6,470,030 B1* | 10/2002 | Park | H04L 27/2647 370/230 |
| 6,618,452 B1* | 9/2003 | Huber | H04L 27/2607 370/512 |
| 2004/0120307 A1 | 6/2004 | Takahashi et al. | |
| 2005/0169408 A1* | 8/2005 | Kim | H04L 27/2659 375/343 |
| 2006/0239370 A1* | 10/2006 | Mody | H04L 27/2659 375/260 |
| 2007/0071123 A1* | 3/2007 | Charbit | H04L 27/2659 375/260 |
| 2007/0280098 A1* | 12/2007 | Bhatt | H04L 27/2656 370/208 |
| 2009/0175394 A1* | 7/2009 | Park | H04L 27/2659 375/362 |
| 2010/0290569 A1* | 11/2010 | Bury | H04L 27/2662 375/343 |
| 2011/0007854 A1* | 1/2011 | Li | H04L 27/2659 375/344 |
| 2012/0155577 A1* | 6/2012 | Shukla | H04L 25/022 375/340 |
| 2014/0198830 A1* | 7/2014 | Sen | H04L 25/0204 375/150 |
| 2016/0119174 A1* | 4/2016 | Chavali | H04L 27/2672 370/252 |
| 2017/0126460 A1* | 5/2017 | Dutronc | H04L 27/2639 |

FOREIGN PATENT DOCUMENTS

| | | |
|---|---|---|
| WO | 2011100858 A1 | 8/2011 |
| WO | 2012055065 A1 | 5/2012 |

OTHER PUBLICATIONS

3GPP TS 36.211 version 12.5.0, 3rd Generation Partnership Project; Technical Specification Group Radio Access Network; Evolved Universal Terrestrial Radio Access (E-UTRA); Physical channels and modulation, Release 12, Mar. 2015, 136 pages.

Sesia, S. et al., "LTE—The UMTS Long Term Evolution: From Theory to Practice", Second Edition, Including Release 10 for LTE-Advanced, John Wiley & Sons, Ltd. Published 2011, 794 pages.

* cited by examiner

WIRELESS COMMUNICATION DEVICE AND METHOD THEREIN FOR TIME SYNCHRONIZATION IN A WIRELESS COMMUNICATION NETWORK

CROSS REFERENCE TO RELATED APPLICATION(S)

This application is a 35 U.S.C. § 371 National Stage of International Patent Application No. PCT/CN2015/096546, filed Dec. 7, 2015, designating the United States, which is incorporated by reference.

TECHNICAL FIELD

Embodiments herein relate to a wireless communication device, and a method therein. In particular, they relate to performing both coarse and fine time synchronization in the wireless communication device based on a synchronization signal exclusively in a wireless communication network.

BACKGROUND

Wireless communication devices such as User Equipment (UE) are also known as e.g. wireless terminals, mobile terminals and/or mobile stations. UEs are enabled to communicate or operate wirelessly in a wireless communication environment comprising multiple mobile communications networks, such as cellular communications networks which comprising Second/Third Generation (2G/3G) networks, 3G Long Term Evolution (LTE) networks etc. In these communications networks, a cell search procedure is usually performed in the UE, which consists of a series of synchronization stages by which the UE determines time and frequency parameters that are necessary to demodulate downlink (DL) signals received from a network node and to transmit uplink (UL) signals to the network node with the correct timing.

For example, in the 3GPP specifications for LTE, a DL signal transmission is mandatory, e.g., a synchronization signal, with fixed and known timing or periodicity or frequency position, in order to enable an initial UE access. Specifically, to assist the UE to perform a cell search, two special signals are transmitted on each downlink component carrier: the Primary Synchronization Signal (PSS) and the Secondary Synchronization Signal (SSS). The time synchronization in 3G LTE network is performed by the UE in two stages. The first stage is a coarse time synchronization, to acquire a symbol timing by detection of the synchronization signal PSS. The coarse time synchronization obtained from the synchronization signal is rather rough and with large timing error. The second stage is fine time synchronization, which is obtained based on Common Reference Signal (CRS). Since CRS occupies much wider bandwidth than the synchronization signal does, it offers much higher timing resolution.

The next generation of mobile communications networks, e.g. 5G networks, is currently emerging, where massive beamforming may be employed as a useful component. One envisioned solution is that each network node has a large number of narrow fixed beams that a UE can be connected to, so called grid-of-beams beamforming. Consequently, one aspect of the design is to minimize the static always-on signals or beams in order to reduce energy consumption at the network node side and to reduce interference to UEs served by the neighbouring base stations or network nodes. Thus CRS may not be employed anymore in 5G networks.

Data demodulation relies on DeModulation Reference Signal (DMRS), which only exists in transmit time intervals (TTIs), i.e. scheduled time intervals that are allocated for a UE specific transmission, when there is data to be transmitted to the UE on Physical Downlink Shared Channel (PDSCH), and only in resource blocks (RBs) where PDSCH is allocated.

Therefore, the state-of-art solution for time synchronization in 3G LTE network cannot be used for the next generation of mobile communications networks. Further, it is not possible to achieve high timing accuracy and low computational complexity at the same time in the state-of-art solution.

SUMMARY

It is therefore an object of embodiments herein to provide a time synchronization method with improved performance for a wireless communication device in a wireless communications network.

According to a first aspect of embodiments herein, the object is achieved by a method performed in a wireless communication device for time synchronization in a wireless communications network. The wireless communication device determines a first timing by performing a coarse time synchronization based on a synchronization signal received by the wireless communication device, wherein the received synchronization signal is sampled either in an original sampling rate or a reduced sampling rate. The wireless communication device determines a second timing by performing a fine time synchronization based on the determined first timing and the received synchronization signal. The determining of the first timing further comprises selecting a number of timing offset values with a granularity corresponding to or smaller than a length of a shortest cyclic-prefix supported by the synchronization signal; obtaining channel estimates by performing channel estimations on the received synchronization signal for each selected timing offset value in frequency domain; transforming the channel estimates in frequency domain to time domain; calculating channel powers for each selected timing offset value based on its channel estimates in time domain; and determining the first timing based on the calculated channel powers.

According to a second aspect of embodiments herein, the object is achieved by a wireless communication device for time synchronization in a wireless communications network. The wireless communication device is configured to determine a first timing by performing a coarse time synchronization based on a synchronization signal received by the wireless communication device, wherein the received synchronization signal is sampled either in an original sampling rate or a reduced sampling rate. The wireless communication device is further configured to determine a second timing by performing a fine time synchronization based on the determined first timing and the received synchronization signal. The wireless communication device is configured to determine the first timing by being configured to select a number of timing offset values with a granularity corresponding to or smaller than a length of a shortest cyclic-prefix supported by the synchronization signal; obtain channel estimates by performing channel estimations on the received synchronization signal for each selected timing offset value in frequency domain; transform the channel estimates in frequency domain to time domain; calculate channel powers for each selected timing offset value based on its channel estimates in time domain; and determine the first timing based on the calculated channel powers.

The time synchronization procedure according to embodiments herein may include performing both the coarse and fine time synchronization on the synchronization signal exclusively. The value of timing offset in the coarse time synchronization may be selected with a granularity corresponding to or smaller than the length of the shortest cyclic-prefix supported by the synchronization signal, i.e. not the finest resolution of 1 sample of the sampling rate. Thus the number of timing offset to be compared can be greatly reduced by a factor corresponding to the length of the shortest cyclic-prefix supported by the synchronization signal, which greatly reduces the computational complexity in the time synchronization. For any given value of timing offset, channel estimation in frequency domain is performed and the channel estimation result is transformed back into time domain. Then the channel powers for each selected timing offset value is calculated in time domain and a first timing is determined based on the calculated channel power.

The first timing is further refined by performing the fine time synchronization based also on the same synchronization signal. After the fine time synchronization, high timing accuracy as 1 sample of the original sampling rate may be achieved.

Therefore the time synchronization method according to embodiments herein has improved performance which achieves high timing accuracy and low computational complexity at the same time.

BRIEF DESCRIPTION OF THE DRAWINGS

Examples of embodiments herein are described in more detail with reference to attached drawings in which.

DETAILED DESCRIPTION

In the following description, the term UE is frequently used to denote a wireless communication device and these two terms are thus used interchangeably herein. As part of explaining embodiments herein, some issues will first be identified and discussed with reference to a state-of-art solution for time synchronization.

Figure 1:
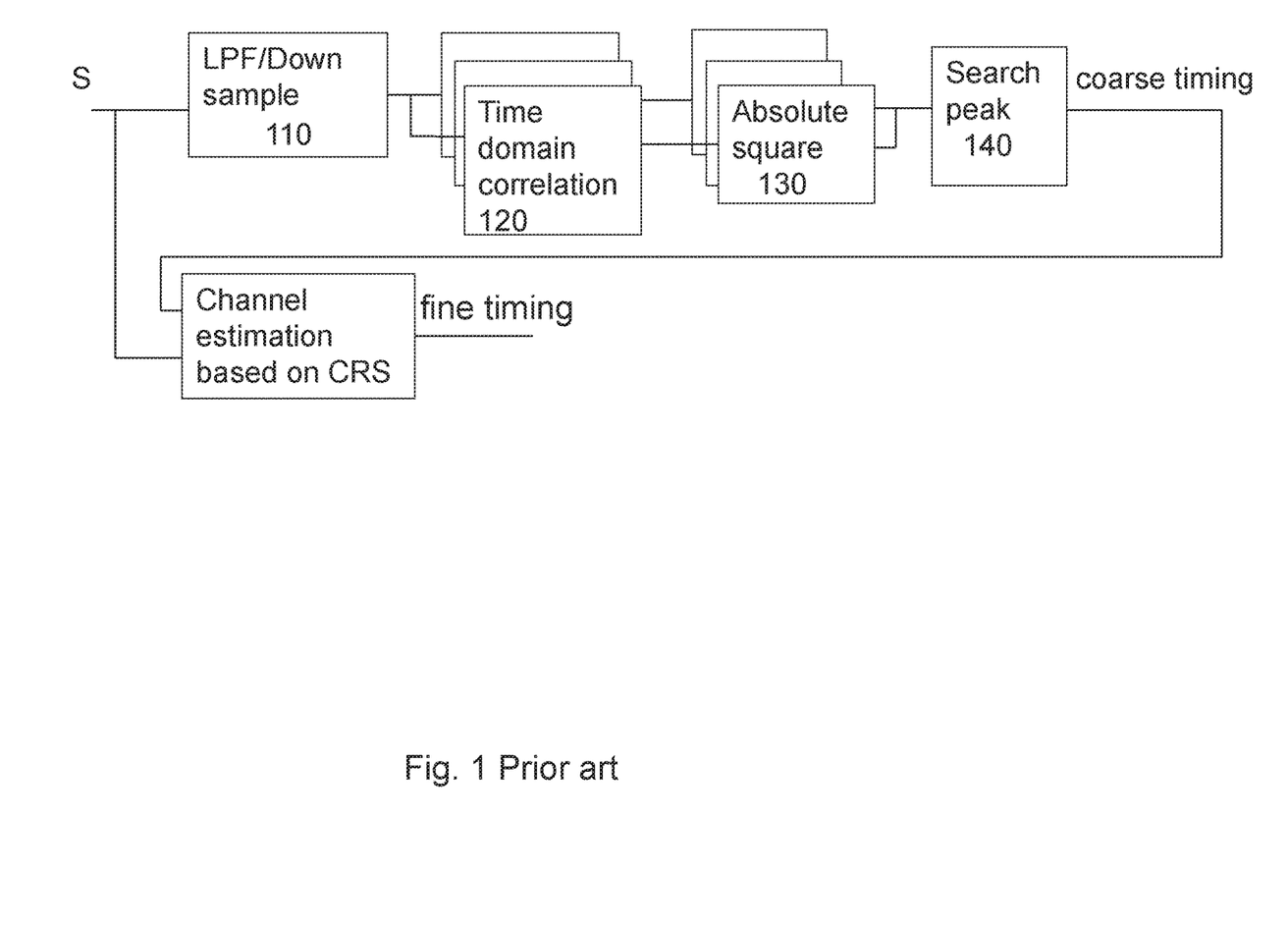
FIG. 1 is a block diagram illustrating a state-of-art time synchronization procedure.

FIG. 1 shows a time synchronization procedure performed by a UE according to the state-of-art when CRS is used. As discussed above, the first stage of time synchronization is to acquire a symbol timing by the detection of PSS. The UE must detect the PSS without any a priori knowledge of the channel, so non-coherent correlation is performed in the time domain for PSS timing detection to find the timing offset $m^*_M$ that corresponds to the maximum correlation, i.e.

$$m_M^* = \mathrm{argmax}_m |\Sigma_{i=0}^{N-1} y[i+m]s_M^*[i]|^2 \qquad \text{Eq. 1}$$

where i is time index, m is the timing offset, N is the PSS time-domain signal length, y[i] is the received signal in the time domain at time instant i and $s_M[i]$ is the PSS in the time domain with root M replica signal at time i.

When using a sampling rate of 30.72 Msps of the received signal, which corresponds to a Fast Fourier Transform (FFT) size of 2048, the PSS signal length in the time-domain is 2048 samples. The finest resolution of timing offset is 1 sample with the sampling rate of 30.72 Msps. The computational complexity of time domain correlation is very high to reach the finest symbol synchronization, because of the great number of correlation operations involved, which are decided by all possible values of m, and length of correlation operations, which is decided by PSS time-domain signal length of N.

To reduce the complexity of time domain correlation, the received signal commonly passes through a low-pass filter and is down sampled, as shown in block 110 in FIG. 1. The bandwidth of the low-pass filter may, for example correspond to a bandwidth of the central 62 sub-carriers, and then the received signal is down-sampled by, for example, a sampling rate of 1.92 Msps, which corresponds to a FFT size of 128. In this case the PSS signal length in the time-domain is 128 samples. The finest resolution of timing offset is 1 sample with the reduced sampling rate of 1.92 Msps, which corresponds to 16 samples with the sampling rate of 30.72 Msps.

The series of operations in the first stage of time synchronization, as expressed in Eq. 1, include time domain correlation, absolute square and search for peak as shown in blocks 120, 130, 140 respectively, in FIG. 1. After these operations, a coarse timing is obtained based on the synchronization signal PSS, which is rather rough and with a timing error in the range of (−8, 8] samples with the sampling rate of 30.72 Msps. The fine timing synchronization with higher timing resolution is then obtained based on the CRS in an afterward operation in the second stage.

As can be seen, the symbol timing acquisition is performed in time domain, and it is therefore not possible to achieve high timing accuracy and low computational complexity at the same time. When the received signal is down-sampled in order to reduce the computational complexity as in the above-described procedure, the accuracy of the time synchronization is reduced as well. Furthermore, this procedure relies on CRS over the whole bandwidth to obtain the fine timing, which signal may not exist for the next generation of communications networks.

Embodiments herein provide a method for time synchronization which performs both the coarse and fine time synchronization on the synchronization signal exclusively. Thereby, the computational complexity can be reduced while still achieving high timing accuracy as 1 sample of the original sampling rate.

Figure 2:
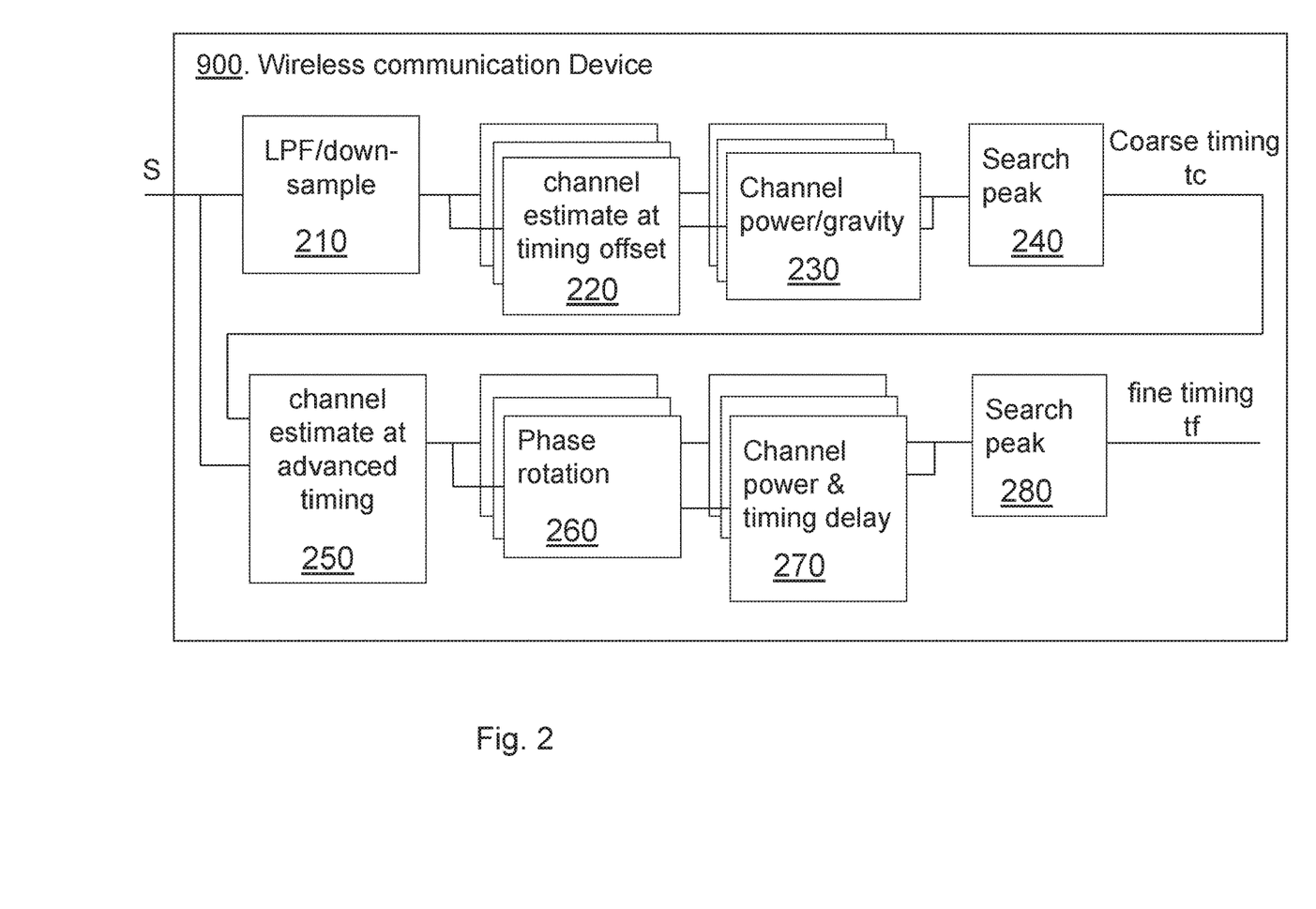
FIG. 2 is a block diagram illustrating a time synchronization procedure in a wireless communication device according to embodiments herein.

FIG. 2 shows a time synchronization procedure in a wireless communication device 900 according to embodiments herein. The wireless communication device 900 may e.g. be a user equipment, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. As depicted in FIG. 2, a synchronization signal S received by the wireless communication device 900, may first pass through a Low Pass Filter (LPF) in Block 210 and is optionally down-sampled. After sampling, the following series of operations may be performed: channel estimates, performed in Block 220, on the sampled synchronization signal at a timing offset in frequency domain; calculating channel power performed in Block 230, channel gravity position may also be calculated in Block 230; determining a first timing tc by e.g. search for peak performed in Block 240. After these operations, a coarse timing tc is obtained based on the synchronization signal. After the coarse timing synchronization procedure, a fine timing procedure is performed based on the same synchronization signal S. The fine timing procedure may include the following operations: channel estimation at an advanced timing in Block 250, phase rotation in Block 260, channel power and timing delay in Block 270 and search peak in Block 280.

Figure 3A:
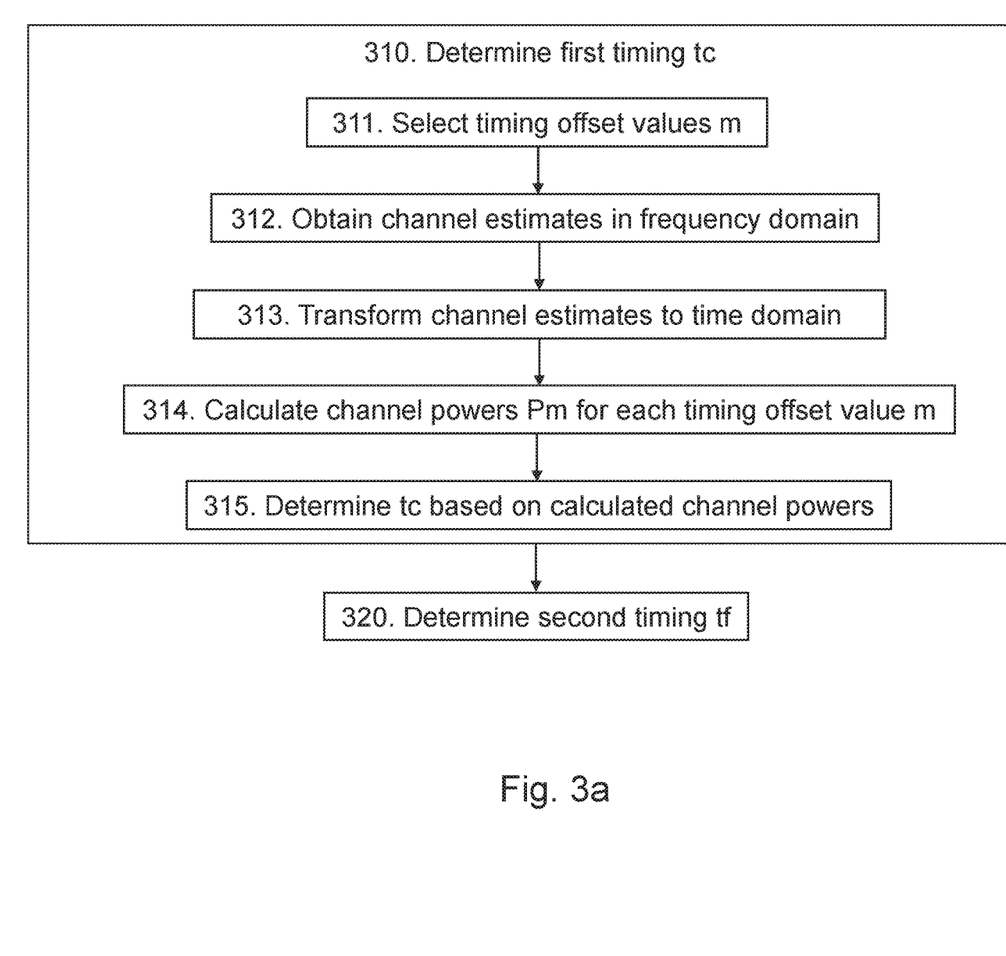
FIGS. 3a and 3b are flowcharts depicting embodiments of the method in the wireless communication device according to embodiments herein.
Figure 3B:
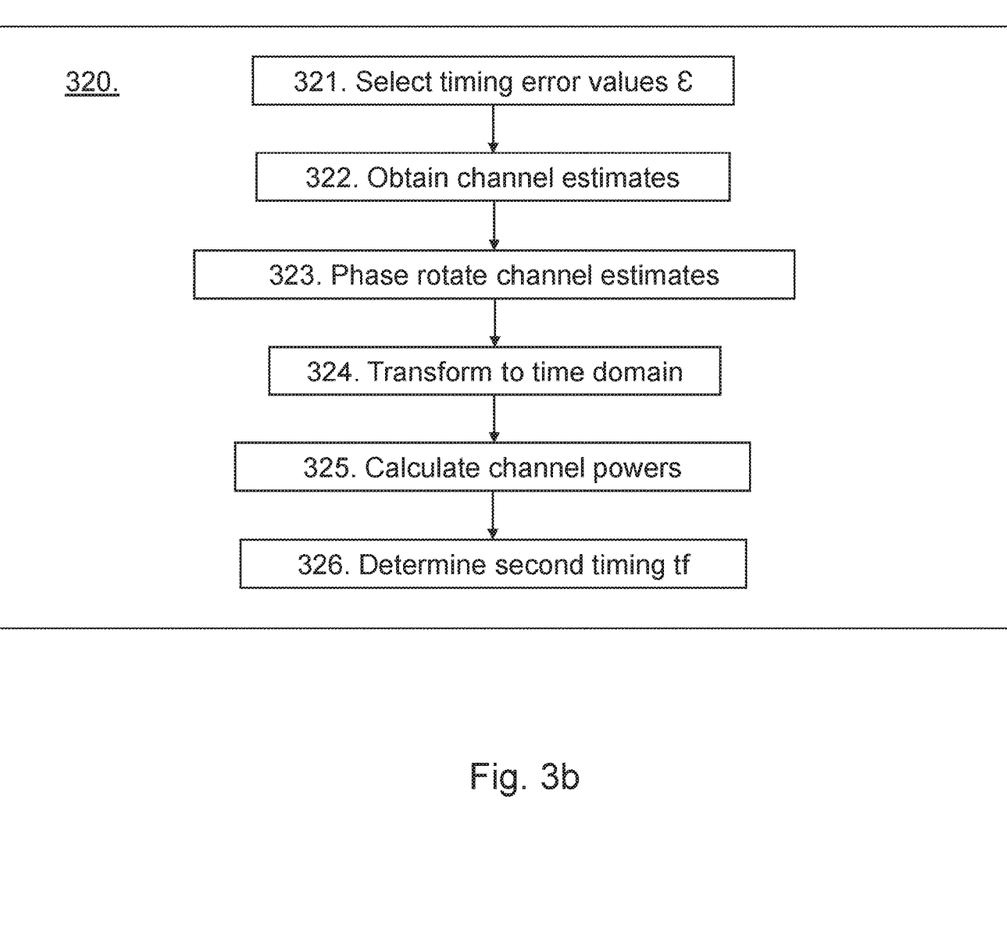

A time synchronization method performed in the wireless communication device according to the time synchronization procedure shown in FIG. 2, will now be described with reference to FIGS. 3a and 3b, which show flowcharts of the time synchronization method according to embodiments herein. The method comprises the following actions, which actions may be taken in any suitable order.

Action 310

This Action is a coarse time synchronization to determine a first timing tc. The wireless communication device 900 determines a first timing, tc, by performing a coarse time synchronization based on a synchronization signal received by it. The received synchronization signal is sampled either in an original sampling rate or a reduced sampling rate, i.e. the coarse time synchronization may be performed on the received synchronization signal with either an original sampling rate $F_{original}$ or a reduced sampling rate $F_{reduced}$.

The first timing tc determined by Action 310 is rather coarse and a fine time synchronization may be obtained by performing the following action.

Action 320

The wireless communication device 900 determines a second timing tf by performing a fine time synchronization based on the determined first timing tc and the received synchronization signal.

A detailed exemplary procedure for Action 310 will be described for the received synchronization signal with the reduced sampling rate $F_{reduced}$. According to some embodiments herein, Action 310 of determining the first timing tc comprises the following actions described below with reference to FIG. 3a.

Action 311

The wireless communication device 900 selects a number of timing offset values m with a granularity corresponding to a length of the shortest cyclic-prefix supported by the synchronization signal.

The value of timing offset m is thus selected with a granularity corresponding to or smaller than the length of the shortest cyclic-prefix, cp, supported by the synchronization signal, i.e. not the finest resolution of 1 sample with the sampling rate. For example, m=0, cp, 2cp, 3cp, where cp is the length of the shortest cyclic-prefix with the reduced sampling rate. For example, a cp=9 with a reduced sampling rate of 1.92 Msps, corresponds to a cp=144 with the original sampling rate of 30.72 Msps.

Action 312

The wireless communication device 900 obtains channel estimates by performing channel estimations on the received synchronization signal for each selected timing offset value m in frequency domain. This corresponds to the procedure shown by block 220 in FIG. 2. This means that a raw Discrete Fourier Transform (DFT) channel estimation is performed on the down-sampled signal at a timing offset m.

Action 313

The wireless communication device 900 transforms the channel estimates in frequency domain to time domain.

Action 314

The wireless communication device 900 calculates channel powers Pm for each selected timing offset value m based on its channel estimates in time domain. This corresponds to the procedure shown by Block 230 in FIG. 2.

Action 315

The wireless communication device 900 determines the first timing tc based on the calculated channel powers.

As discussed above in Action 311, the value of timing offset in the coarse time synchronization may be selected with a granularity corresponding to or smaller than the length of the shortest cyclic-prefix supported by the synchronization signal, i.e. not the finest resolution of 1 sample of the sampling rate. Thus the number of timing offset to be compared can be greatly reduced by a factor corresponding to the length of the shortest cyclic-prefix supported by the synchronization signal, which greatly reduces the computational complexity in the time synchronization. Further, for any given value of timing offset, channel estimation in frequency domain is performed and the channel estimation result is transformed back into time domain. Then the channel powers for each selected timing offset value is calculated in time domain and the first timing is determined based on the calculated channel power. Compared to time domain correlation, channel estimation in frequency domain further reduces the computational complexity.

The first timing tc is further refined by means of an adjusted DFT channel estimation on the synchronization signal to determine the second timing tf. A detailed exemplary procedure for how Action 320 can be performed will be described below with reference to FIG. 3b.

According to some embodiments herein, Action 320 may thus comprise the following actions.

Action 321

The wireless communication device 900 selects a number of timing error values with a granularity corresponding to one sample with the original sampling rate.

The first timing tc detected in the coarse time synchronization is with a timing error compared to the true symbol timing $t_{true}$:

$$E < t_c - t_{true} < E$$

Where $$E = \frac{1}{4} \frac{N_{original}}{L+1}$$

E is the largest timing error. $N_{original}$ is the length of the synchronization signal in the time domain, excluding the cyclic-prefix cp, with the original sampling rate. Then $$A = \left\lceil \frac{1}{4} \frac{N_{original}}{L+1} \right\rceil$$

A is a timing advancement parameter that can be used to combat the impact of any positive timing error i.e. detected timing larger than the actual one, in the coarse time synchronization procedure. Then the resulted timing error after the timing advancement is $$-2\left\lceil \frac{1}{4} \frac{N_{original}}{L+1} \right\rceil < (t_c - t_{true}) - A < 0$$

The hypothesis of timing errors may be selected with granularity of 1 sample with the original sampling rate and in the range of timing error offset by the timing advancement:

$$\varepsilon = \left\{ -2\left\lceil \frac{1}{4} \frac{N_{original}}{L+1} \right\rceil, \dots, -1, 0 \right\}$$

Action 322
The wireless communication device 900 obtains channel estimates by performing channel estimations on the received synchronization signal in frequency domain. This corresponds to the procedure shown in Block 250 in FIG. 2.

Action 323: The wireless communication device 900 phase rotates the channel estimates based on each selected timing error value ε. This corresponds to the procedure shown by Block 260 in FIG. 2.

Action 324: The wireless communication device 900 transforms the phase rotated channel estimates to time domain.

Action 325: The wireless communication device 900 calculates channel powers Pε for each selected timing error values based on its phase rotated channel estimates in time domain. This corresponds to the procedure shown by Block 270 in FIG. 2.

Action 326: The wireless communication device 900 determines the second timing tf based on the calculated channel powers Pε for each selected timing error value ε.

As discussed above, the first timing is further refined by performing the fine time synchronization based also on the same synchronization signal. Since the timing error values ε with a granularity corresponding to one sample with the original sampling rate are selected, after the fine time synchronization, high timing accuracy as 1 sample of the original sampling rate may be achieved.

Figure 4:
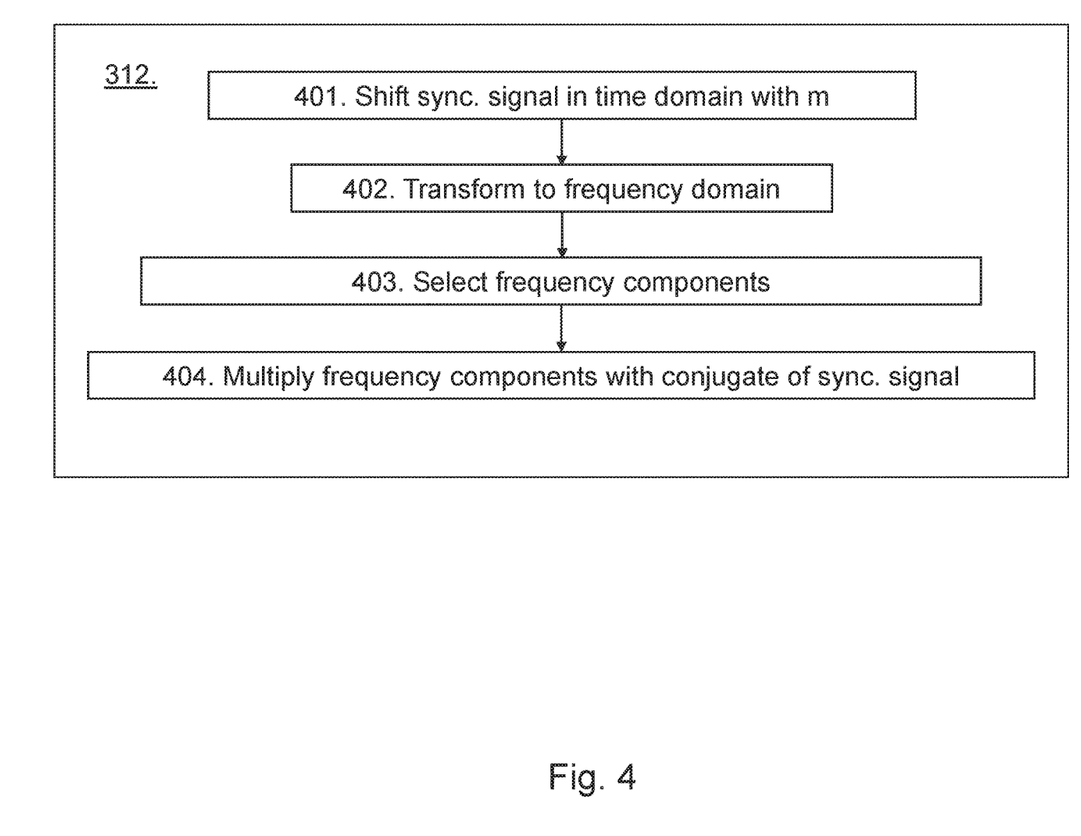
FIG. 4 is a flowchart depicting one example method of channel estimation in coarse time synchronization in a wireless communication device according to embodiments herein.

According to some embodiments, the DFT channel estimation performed in Action 312 may comprise the following actions described in detail below with reference to FIG. 4.

Action 401: The wireless communication device 900 shifts the received synchronization signal in time domain by the selected timing offset value m;

Action 402: The wireless communication device 900 transforms the shifted synchronization signal in time domain into frequency domain;

Action 403: The wireless communication device 900 selects frequency components of central sub-carriers corresponding to the bandwidth occupied by the synchronization signal.

These actions may be expressed in the following equations:

$$YY_m[k] = FFT(y[i+m]),$$
$$i = 0, 1, \dots, N-1$$

$$Y_m[l] = \begin{cases} YY_m\left[l + \left(N - \frac{L}{2}\right)\right], & l = 0, 1, \dots, \frac{L}{2} - 1 \\ 0, & l = \frac{L}{2} \\ YY_m\left[l - \frac{L}{2}\right], & l = \frac{L}{2} + 1, \dots, L \end{cases}$$

where i is time index, N is the length of the synchronization signal in the time-domain excluding the cyclic-prefix cp, y[i] is the received synchronization signal in the time domain at time instant i, L is the length of the synchronization signal in the frequency-domain.

Action 404: The wireless communication device 900 multiplies the selected frequency components with a conjugate of the synchronization signal in the frequency domain to obtain the channel estimates for the selected timing offset value m.

The result from Action 404 is in fact a raw channel estimate in the frequency domain, which may be expressed in the following equations. The channel estimate on the d.c. subcarrier is the linear average of the channel estimate on the 2 closest subcarriers:

$$H_m[l] = \begin{cases} Y_m[l]S_M^*[l], & l = 0, 1, \dots, \frac{L}{2} - 1 \\ \frac{1}{2}\left(Y_m\left[\frac{L}{2}-1\right]S_M^*\left[\frac{L}{2}-1\right] + Y_m\left[\frac{L}{2}+1\right]S_M^*\left[\frac{L}{2}\right]\right), & l = \frac{L}{2} \\ Y_m[l]S_M^*[l-1], & l = \frac{L}{2}+1, \dots, L \end{cases}$$

where $S_M[i]$ is the synchronization signal in the frequency domain with root M.

The raw channel estimate in the frequency domain is first normalized to have unit power. The channel estimate is then transformed back into the time domain and become the channel estimate in the time domain, as expressed in the following equations. The time granularity is N/(L+1) samples of the sampling rate.

$$\overline{H}_m[l] = \frac{1}{\sqrt{\frac{1}{L+1}\sum_{l=0}^{L}|H_m[l]|^2}} H_m[l], l = 0, 1, \dots, L$$

$$h_m[n] = IDFT(\overline{H}_m[l]), l = 0, 1, \dots, L$$

Figure 5:
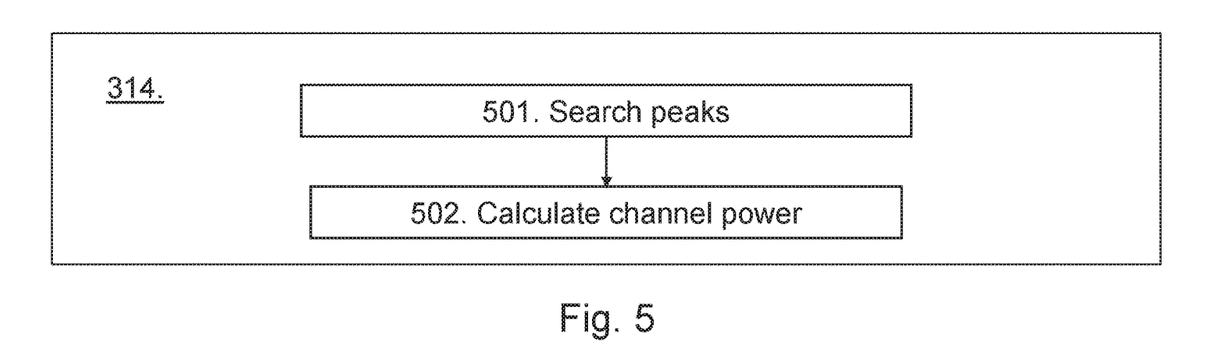
FIG. 5 is a flowchart depicting one example method of calculating channel power in a wireless communication device according to embodiments herein.

According to some embodiments, Action 314 of calculating channel powers Pm when determining the first timing tf may comprise the following actions which are described below with reference to FIG. 5.

Action 501: The wireless communication device 900 searches a peak position in the channel estimates in time domain for the selected timing offset value m. This corresponds to the procedure shown by Block 240 in FIG. 2. This gives the strongest channel estimate at position $n_{m,peak}$ in the time region corresponding to the length of the shortest cyclic-prefix supported by the synchronization signal, which can be expressed as:

$$n_{m,peak} = \text{argmax}_n |h_m[n]|^2, n = 0, 1, \ldots, \left[\frac{L+1}{N}cp\right]$$

Action 502: The wireless communication device 900 calculates the channel power Pm for the selected timing offset value m by combining its channel estimates at the peak position and at a number of positions neighbored to the peak position.

This can be performed such that the time domain channel estimate at the peak position and a few of its neighbours are used to calculate the channel power Pm:

$$P_m = \sum_{n=-B}^{B} |h_m[\text{mod}(n_{m,peak} + n, L+1)]|^2$$

Figure 6:
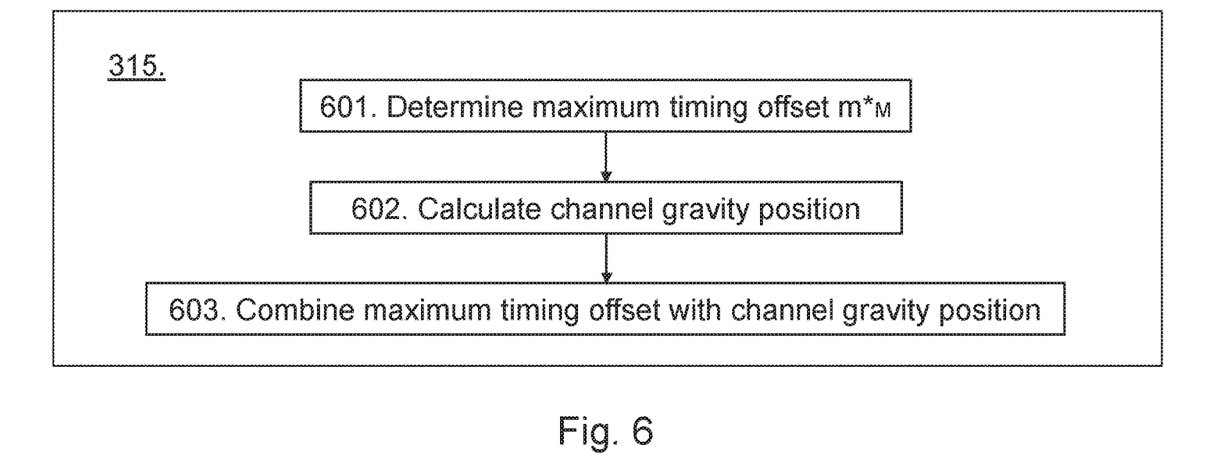
FIG. 6 is a flowchart depicting one example method of determining a first timing in a wireless communication device according to embodiments herein.

According to some embodiments, Action 315, when determining the first timing tc based on the calculated channel powers, may comprise the following actions which are described below with reference to FIG. 6.

Action 601: The wireless communication device 900 may determine maximum timing offset value $m^*_M$ by searching a maximum channel power in the calculated channel powers for each of the selected timing offset values m:

$$m_M^* = \text{argmax}_m P_m$$

Action 602: The wireless communication device 900 may calculate the channel gravity position, Pcg, corresponding to a sum of each channel tap's position multiplying with its corresponding channel power weights, expressed as:

$$Pcg = \frac{N}{L+1} \sum_{n=-B}^{B} (n_{m,peak} + n) \frac{|h_m[\text{mod}(n_{m,peak} + n, L+1)]|^2}{P_m}$$

where B is the amount of neighbours on either side of the peak position. The channel gravity position Pcg represented in samples of the sampling rate is added to the value of timing offset m to represent the corresponding timing delay $t_m$:

$$t_m = m + Pcg = m + \frac{N}{L+1} \sum_{n=-B}^{B} (n_{m,peak} + n) \frac{|h_m[\text{mod}(n_{m,peak} + n, L+1)]|^2}{P_m}$$

Action 603: The wireless communication device 900 may combine the maximum timing offset value $m^*_M$ with the channel gravity position to obtain the first timing tc, i.e. the timing delay that corresponds to the maximum channel power:

$$t_{m_M^*} = m_M^* + \frac{N}{L+1} \sum_{n=-B}^{B} \left(n_{m_M^*,peak} + n\right) \frac{\left|h_m[\text{mod}\left(n_{m_M^*,peak} + n, L+1\right)]\right|^2}{P_m}$$

The obtained timing tc represented in samples of the original sampling rate is:

$$t_c = \left[\frac{F_{original}}{F_{reduced}} t_{m_M^*}\right]$$

If the coarse time synchronization is performed on the received synchronization signal with the original sampling rate, then $$t_c = [t_{m_M^*}]$$

The fine time synchronization is performed on the received synchronization signal with the original sampling rate. Similar to the channel estimation procedures in the coarse time synchronization, the channel estimation in Action 322 may comprise the following actions, which actions are described in detail with reference to FIG. 7.

Figure 7:
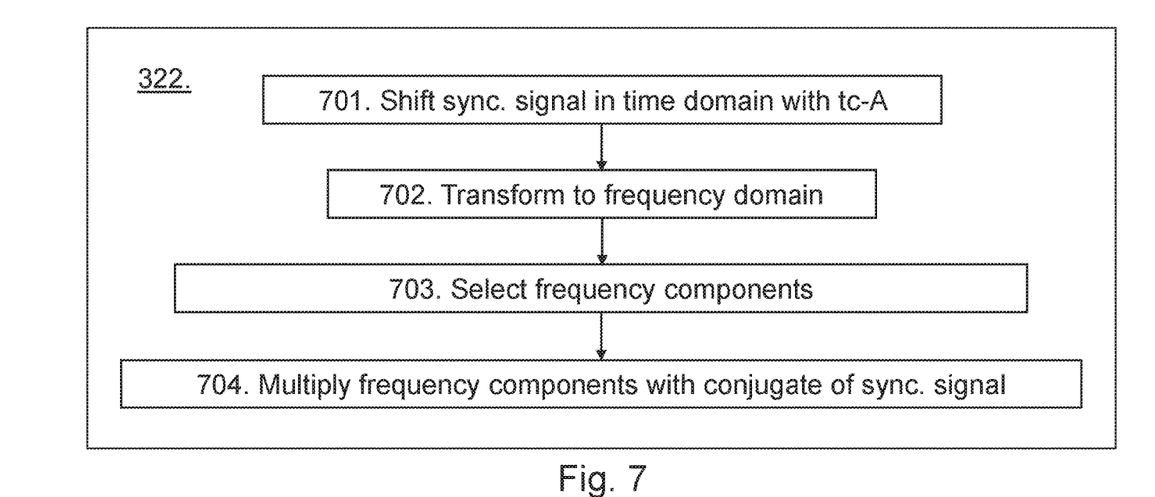
FIG. 7 is a flowchart depicting one example method of channel estimation in fine time synchronization in a wireless communication device according to embodiments herein.

Action 701: The wireless communication device 900 shifts the received synchronization signal in time domain by the determined first timing tc adjusted by a timing advancement parameter A.

Action 702: The wireless communication device 900 transforms the shifted synchronization signal in time domain to frequency domain.

Actions 701 and 702 may be expressed as:

$$YY[k] = FFT(y[i+t_c-A]), i=0,1,\ldots, N_{original}-1$$

where the timing advancement parameter A corresponds to the largest timing error E as described above in Action 321.

Action 703: The wireless communication device 900 selects frequency components of central sub-carriers corresponding to a bandwidth of the synchronization signal, which may be expressed as:

$$Y[l] = \begin{cases} YY\left[l + \left(N - \frac{L}{2}\right)\right], & l = 0, 1, \ldots, \frac{L}{2} - 1 \\ 0, & l = \frac{L}{2} \\ YY\left[l - \frac{L}{2}\right], & l = \frac{L}{2} + 1, \ldots, L \end{cases}$$

Action 704: The wireless communication device 900 multiplies the selected frequency components with a conjugate of the synchronization signal in frequency domain to obtain the channel estimates. This action provides a raw channel estimate which includes the channel estimate on the d.c. subcarrier:

$$H[l] = \begin{cases} Y[l]S_M^*[l], & l = 0, 1, \ldots, \frac{L}{2} - 1 \\ \frac{1}{2}\left(Y\left[\frac{L}{2} - 1\right]S_M^*\left[\frac{L}{2} - 1\right] + Y\left[\frac{L}{2} + 1\right]S_M^*\left[\frac{L}{2}\right]\right), & l = \frac{L}{2} \\ Y[l]S_M^*[l-1], & l = \frac{L}{2} + 1, \ldots, L \end{cases}$$

where $S_M[i]$ is the synchronization signal in the frequency domain with root M.

The raw channel estimate in the frequency domain is normalized to have unit power.

$$\overline{H}[l] = \frac{1}{\sqrt{\frac{1}{L+1}\sum_{l=0}^{L}|H[l]|^2}} H[l], l = 0, 1, \ldots, L$$

After the channel estimate is obtained, a phase rotation is applied on the channel estimate. Applying phase rotation in the frequency domain according to a hypothesis of timing error, timing estimation can be performed in any integral and fractional samples. Therefore the fine timing estimation may be performed with a granularity of 1 sample of the original sampling rate. Phase rotation in the frequency domain is equivalent to time shifting in the time domain. For any given value of hypothesis of timing error, a phase rotation sequence in the frequency domain is calculated and multiplied to the raw channel estimate and the phase rotated channel estimate is then transformed back into the time domain, expressed as:

$$R_\varepsilon[l] = e^{j2\pi \frac{-\varepsilon}{N_{original}} l}, l = 0, 1, \ldots, L$$

$$H_\varepsilon[l] = R_\varepsilon[l]\overline{H}[l], l = 0, 1, \ldots, L$$

$$h_\varepsilon[n] = IDFT(H_\varepsilon[l]), l = 0, 1, \ldots, L$$

According to some embodiments, calculating the channel power P$\varepsilon$ in Action 325 may be performed by combining the channel estimates at its origin position, i.e. no position shifting and at a number of its neighbors' positions:

$$P_\varepsilon = \sum_{n=-B}^{B} |h_\varepsilon[\mod(n, L+1)]|^2$$

Figure 8:
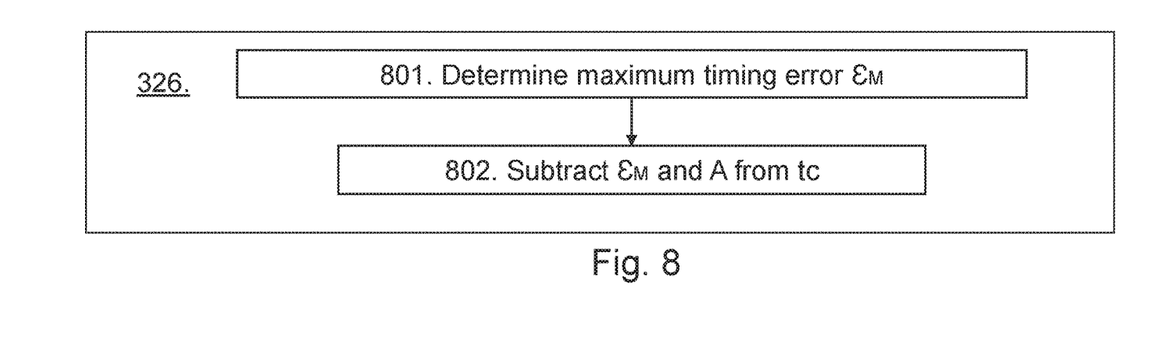
FIG. 8 is a flowchart depicting one example method of determining a second timing in a wireless communication device according to embodiments herein.

According to some embodiments, determining the second timing tf in Action 326 may comprise the following actions with reference to FIG. 8.

Action 801: The wireless communication device 900 determines a maximum timing error value $\varepsilon^*_M$ by searching a maximum channel power in the calculated channel powers for each of the selected timing error values $\varepsilon$:

$$\varepsilon_M^* = \mathrm{argmax}_\varepsilon P_\varepsilon$$

This corresponds to the procedure shown by Block 280 in FIG. 2.

Action 802: The wireless communication device 900 subtracts the maximum timing error value $\varepsilon^*_M$ and the timing advancement parameter A from the determined first timing tc to obtain the second timing tf.

The first coarse timing tc subtracted by the timing advancement A and the timing errors $\varepsilon$ becomes the timing delay:

$$t_\varepsilon = (t_c - A) - \varepsilon$$

The symbol timing detection is to find the timing delay that corresponds to the maximum channel power:

$$t_{\varepsilon^*M} = (t_c - A) - \varepsilon_M^*$$

The obtained fine timing synchronization is with granularity of 1 sample of the original sampling rate:

$$t_f = [t_{\Sigma M^*}]$$

Figure 9:
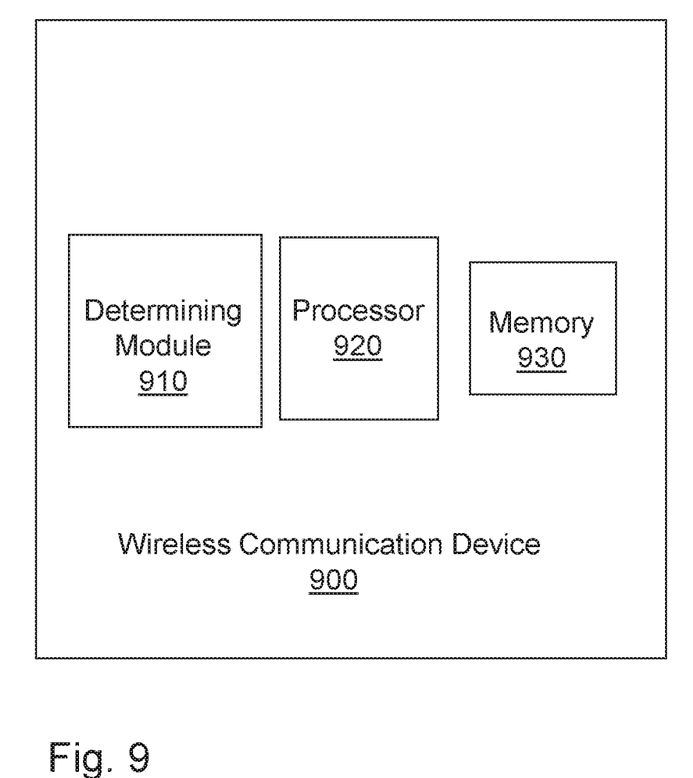
FIG. 9 is a schematic block diagram illustrating embodiments of a wireless communication device.

To perform the actions and operations in a wireless communication device 900 for time synchronization in a wireless communication network according to any of the above-described with reference to FIGS. 2-8, the wireless communication device 900 comprises the following circuits or modules as depicted in FIG. 9.

The wireless communication device 900 may e.g. be a user equipment, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. The wireless communication device 900 may comprise, e.g. a determining module 910.

The wireless communication device 900 is configured to, e.g. by means of the determining module 910 being configured to, determine a first timing tc by performing a coarse time synchronization based on a synchronization signal received by the wireless communication device 900, wherein the received synchronization signal is sampled either in an original sampling rate or a reduced sampling rate; and determine a second timing tf by performing a fine time synchronization based on the determined first timing tc and the received synchronization signal.

According to the embodiments herein, the wireless communication device 900 and/or the determining module 910 is configured to determine the first timing tc, by being configured to select a number of timing offset m values with a granularity corresponding to or smaller than a length of the shortest cyclic-prefix supported by the synchronization signal. The wireless communication device 900 and/or the determining module 910 is further configured to obtain channel estimates by performing channel estimations on the received synchronization signal for each selected timing offset value m in frequency domain. The wireless communication device 900 and/or the determining module 910 is further configured to transform the channel estimates in frequency domain to time domain. The wireless communication device 900 and/or the determining module 910 is further configured to calculate channel powers Pm for each selected timing offset value m based on its channel estimates in time domain. The wireless communication device 900 and/or the determining module 910 is further configured to determine the first timing tc based on the calculated channel powers.

According to some embodiments, the wireless communication device (900) and/or the determining module 910 is configured to determine the second timing by being configured to select a number of timing error values c with a granularity corresponding to one sample with the original sampling rate. The wireless communication device 900 and/or the determining module 910 is further configured to obtain channel estimates by performing channel estimations on the received synchronization signal in frequency domain. The wireless communication device 900 and/or the determining module 910 is further configured to phase rotate the channel estimates based on each selected timing error value. The wireless communication device 900 and/or the determining module 910 is further configured to transform the phase rotated channel estimates to time domain. The wireless communication device 900 and/or the determining module 910 is further configured to calculate channel powers P$\varepsilon$ for each selected timing error values based on its phase rotated channel estimates in time domain and determine the second timing tf based on the calculated channel powers P$\varepsilon$ for each selected timing error value $\varepsilon$.

According to some embodiments, the wireless communication device 900 and/or the determining module 910 is configured to obtain channel estimates when determine the first timing tf, by being configured to shift the received synchronization signal in time domain by the selected timing offset value m. The wireless communication device 900 and/or the determining module 910 is further configured to transform the shifted synchronization signal in time domain to frequency domain. The wireless communication device 900 and/or the determining module 910 is further configured to select frequency components of sub-carriers corresponding to a bandwidth of the synchronization signal and multiply the selected frequency components with a conjugate of the synchronization signal in frequency domain to obtain the channel estimates for the selected timing offset value m.

According to some embodiments, the wireless communication device 900 and/or the determining module 910 is configured to calculate channel powers Pm, when determine the first timing tf, by being configured to search a peak position in the channel estimates in time domain for the selected timing offset value m and calculate the channel power Pm for the selected timing offset value m by combining its channel estimates at the peak position and at a number of positions neighbored to the peak position.

According to some embodiments, the wireless communication device 900 and/or the determining module 910 is configured to determine the first timing tc, by being configured to determine a maximum timing offset value $m^*_M$ by searching a maximum channel power in the calculated channel powers for each of the selected timing offset values m and calculate a channel gravity position. The wireless communication device 900 and/or the determining module 910 is further configured to combine the maximum timing offset value $m^*_{S_M}$ with the channel gravity position to obtain the first timing tc.

According to some embodiments, the wireless communication device 900 and/or the determining module 910 is configured to obtain channel estimates, when determine the second timing tf, by being configured to shift the received synchronization signal in time domain by the determined first timing tc adjusted by a timing advancement parameter A. The timing advancement parameter A corresponds to a largest timing error E. The wireless communication device 900 and/or the determining module 910 is further configured to transform the shifted synchronization signal in time domain to frequency domain and select frequency components of sub-carriers corresponding to a bandwidth of the synchronization signal. The wireless communication device 900 and/or the determining module 910 is further configured to multiply the selected frequency components with a conjugate of the synchronization signal in frequency domain to obtain the channel estimates.

According to some embodiments, the wireless communication device 900 and/or the determining module 910 is configured to calculate channel powers Pε for each selected timing error value ε, by being configured to calculate the channel power Pε by combining the channel estimates at its origin position and at a number of its neighbors positions.

According to some embodiments, the wireless communication device 900 and/or the determining module 910 is configured to determine the second timing tf based on the calculated channel powers Pε for each selected timing error value ε, by being configured to determine a maximum timing error value $\varepsilon^*_M$ by searching a maximum channel power in the calculated channel powers for each of the selected timing error values ε and subtract the maximum timing error value $\varepsilon^*_M$ and the timing advancement parameter A from the determined first timing tc to obtain the second timing tf.

Those skilled in the art will appreciate that the determining module 910 described above may be referred to one module, a combination of analog and digital circuits, one or more processors, such as processor 920, depicted in FIG. 9, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The wireless communication device 900 may further comprise a memory 930 comprising one or more memory units. The memory 930 is arranged to be used to store information, data, determined or calculated values, as well as configurations to perform the methods herein when being executed in the wireless communication device 900.

The embodiments herein in the wireless communication device 900 for time synchronization in a wireless communication network may be implemented through one or more processors, such as the processor 920 in the wireless communication device 900 together with computer program code for performing the functions and actions of the embodiments herein. The program code mentioned above may also be provided as a computer program product, for instance in the form of a data carrier carrying computer program code for performing the embodiments herein when being loaded into the wireless communication device 900. One such carrier may be in the form of a CD ROM disc. It is however feasible with other data carriers such as a memory stick. The computer program code may furthermore be provided as pure program code on a server and downloaded to the wireless communication device 900.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the solution described herein, which is defined by the appending claims.

The invention claimed is:

1. A method performed in a wireless communication device for time synchronization in a wireless communication network, the method comprising:
  determining a first timing, tc, by performing a coarse time synchronization based on a synchronization signal received by the wireless communication device, wherein the received synchronization signal is sampled either in an original sampling rate or a reduced sampling rate; and
  determining a second timing, tf, by performing a fine time synchronization based on the determined first timing and the received synchronization signal, wherein
  determining the first timing comprises:
    selecting a number of timing offset, m, values with a granularity corresponding to or smaller than a length of the shortest cyclic-prefix supported by the synchronization signal;
    obtaining channel estimates by performing channel estimations on the received synchronization signal for each selected timing offset value in frequency domain;
    transforming the channel estimates in frequency domain to time domain;
    calculating channel powers, Pm, for each selected timing offset value based on its channel estimates in time domain; and
    determining the first timing based on the calculated channel powers.

2. The method of claim 1, wherein the determining the second timing comprises:
- selecting a number of timing error values, ε, with a granularity corresponding to one sample with the original sampling rate;
- obtaining channel estimates by performing channel estimations on the received synchronization signal in frequency domain;
- phase rotating the channel estimates based on each selected timing error value;
- transforming the phase rotated channel estimates to time domain;
- calculating channel powers, Pε, for each selected timing error value based on its phase rotated channel estimates in time domain; and
- determining the second timing based on the calculated channel powers for each selected timing error value.

3. The method according to claim 2, wherein the obtaining channel estimates when determining the second timing comprises:
- shifting the received synchronization signal in time domain by the determined first timing adjusted by a timing advancement parameter, A, wherein the timing advancement parameter corresponds to a largest timing error, E;
- transforming the shifted synchronization signal in time domain to frequency domain;
- selecting frequency components of sub-carriers corresponding to a bandwidth of the synchronization signal; and
- multiplying the selected frequency components with a conjugate of the synchronization signal in frequency domain to obtain the channel estimates.

4. The method according to claim 2, wherein the calculating channel powers for each selected timing error value comprises:
- calculating the channel power by combining the channel estimates at its origin position and at a number of its neighbors positions.

5. The method according to claim 2, wherein the determining the second timing based on the calculated channel powers for each selected timing error value comprises:
- determining a maximum timing error value, $\varepsilon^*_M$, by searching a maximum channel power in the calculated channel powers for each of the selected timing error values;
- subtracting the maximum timing error value and the timing advancement parameter from the determined first timing to obtain the second timing.

6. The method according to claim 1, wherein the obtaining channel estimates when determining the first timing further comprises:
- shifting the received synchronization signal in time domain by the selected timing offset value;
- transforming the shifted synchronization signal in time domain to frequency domain;
- selecting frequency components of sub-carriers corresponding to a bandwidth of the synchronization signal; and
- multiplying the selected frequency components with a conjugate of the synchronization signal in frequency domain to obtain the channel estimates for the selected timing offset value.

7. The method according to claim 1, wherein the calculating channel powers when determining the first timing comprises:
- searching a peak position in the channel estimates in time domain for the selected timing offset value; and
- calculating the channel power for the selected timing offset value by combining its channel estimates at the peak position and at a number of positions neighbored to the peak position.

8. The method according to claim 1, wherein the determining the first timing further comprises:
- determining a maximum timing offset value, $m^*_M$, by searching a maximum channel power in the calculated channel powers for each of the selected timing offset values;
- calculating a channel gravity position;
- combining the maximum timing offset value with the channel gravity position to obtain the first timing.

9. A wireless communication device for time synchronization in a wireless communication network, wherein the wireless communication device is configured to:
- determine a first timing, tc, by being configured to perform a coarse time synchronization based on a synchronization signal received by the wireless communication device, wherein the received synchronization signal is sampled either in an original sampling rate or a reduced sampling rate; and
- determine a second timing, tf, by being configured to perform a fine time synchronization based on the determined first timing and the received synchronization signal, wherein
- the wireless communication device is configured to determine the first timing by performing steps comprising:
- selecting a number of timing offset, m, values with a granularity corresponding to or smaller than a length of the shortest cyclic-prefix supported by the synchronization signal;
- obtaining channel estimates by performing channel estimations on the received synchronization signal for each selected timing offset value in frequency domain;
- transforming the channel estimates in frequency domain to time domain;
- calculate channel powers, Pm, for each selected timing offset value based on its channel estimates in time domain; and
- determining the first timing based on the calculated channel powers.

10. The wireless communication device according to claim 9, wherein the wireless communication device is configured to determine the second timing by performing step comprising:
- selecting a number of timing error values, ε, with a granularity corresponding to one sample with the original sampling rate;
- obtaining channel estimates by performing channel estimations on the received synchronization signal in frequency domain;
- phase rotating the channel estimates based on each selected timing error value;
- transforming the phase rotated channel estimates to time domain;
- calculating channel powers, Pε, for each selected timing error value based on its phase rotated channel estimates in time domain; and
- determining the second timing based on the calculated channel powers for each selected timing error value.

11. The wireless communication device according to claim 10, wherein the wireless communication device is configured to obtain channel estimates, when determining the second timing, by being configured to:

shift the received synchronization signal in time domain by the determined first timing adjusted by a timing advancement parameter, A, wherein the timing advancement parameter corresponds to a largest timing error, E;

transform the shifted synchronization signal in time domain to frequency domain;

select frequency components of sub-carriers corresponding to a bandwidth of the synchronization signal; and multiply the selected frequency components with a conjugate of the synchronization signal in frequency domain to obtain the channel estimates.

12. The wireless communication device according to claim 10, wherein the wireless communication device is configured to calculate channel powers, $P\varepsilon$, for each selected timing error value, $\varepsilon$, by being configured to:

calculate the channel power by combining the channel estimates at its origin position and at a number of its neighbors positions.

13. The wireless communication device according to claim 10, wherein the wireless communication device is configured to determine the second timing based on the calculated channel powers for each selected timing error value, by being configured to:

determine a maximum timing error value, $\varepsilon^*_M$, by searching a maximum channel power in the calculated channel powers for each of the selected timing error values; and subtract the maximum timing error value and the timing advancement parameter from the determined first timing to obtain the second timing.

14. The wireless communication device according to claim 9, wherein the wireless communication device is further configured to obtain channel estimates, when determining the first timing, by being configured to:

shift the received synchronization signal in time domain by the selected timing offset value;

transform the shifted synchronization signal in time domain to frequency domain;

select frequency components of sub-carriers corresponding to a bandwidth of the synchronization signal; and multiply the selected frequency components with a conjugate of the synchronization signal in frequency domain to obtain the channel estimates for the selected timing offset value.

15. The wireless communication device according to claim 9, wherein the wireless communication device is configured to calculate channel powers, when determining the first timing, by being configured to:

search a peak position in the channel estimates in time domain for the selected timing offset value; and calculate the channel power for the selected timing offset value by combining its channel estimates at the peak position and at a number of positions neighbored to the peak position.

16. The wireless communication device according to claim 9, wherein the wireless communication device is configured to determine the first timing by being configured to:

determine a maximum timing offset value, $m^*_M$, by searching a maximum channel power in the calculated channel powers for each of the selected timing offset values;

calculate a channel gravity position; and combine the maximum timing offset value with the channel gravity position to obtain the first timing.

* * * * *